(12) United States Patent
Kao

(10) Patent No.: US 8,376,852 B2
(45) Date of Patent: Feb. 19, 2013

(54) ELECTRONIC SPORT SENSING DEVICE

(75) Inventor: Eddie Kao, Taichung (TW)

(73) Assignee: Sport-Ace International Co., Ltd., Taichung (TW)

( * ) Notice: Subject to any disclaimer, the term of this patent is extended or adjusted under 35 U.S.C. 154(b) by 327 days.

(21) Appl. No.: 12/727,504

(22) Filed: Mar. 19, 2010

(65) Prior Publication Data
US 2011/0190057 A1 Aug. 4, 2011

(51) Int. Cl.
*A63F 9/24* (2006.01)
(52) U.S. Cl. .................. 463/36; 463/2; 463/7; 273/371; 273/400; 473/173; 473/446; 473/455
(58) Field of Classification Search ........................ None
See application file for complete search history.

(56) References Cited

U.S. PATENT DOCUMENTS

| | | | | |
|---|---|---|---|---|
| 5,779,241 A | * | 7/1998 | D'Costa et al. | 273/371 |
| 6,554,284 B2 | * | 4/2003 | Chou | 273/371 |
| 2007/0207349 A1 | * | 9/2007 | Kemper et al. | 429/9 |

* cited by examiner

*Primary Examiner* — Melba Bumgarner
*Assistant Examiner* — George Howarah
(74) *Attorney, Agent, or Firm* — Tracy M. Heims; Apex Juris, pllc

(57) ABSTRACT

An electronic sensing device includes a blanket, at least a sensor unit, and a display unit. The blanket has a circuit unit thereon and a plurality of couplers electrically connected to the circuit unit. The sensor unit is detachably fastened to the blanket and electrically connected to the couplers. The sensor unit has an impact surface. The display unit is electrically connected to the circuit unit of the blanket to show a message when the impact surface of the sensor unit receives an external force.

5 Claims, 12 Drawing Sheets

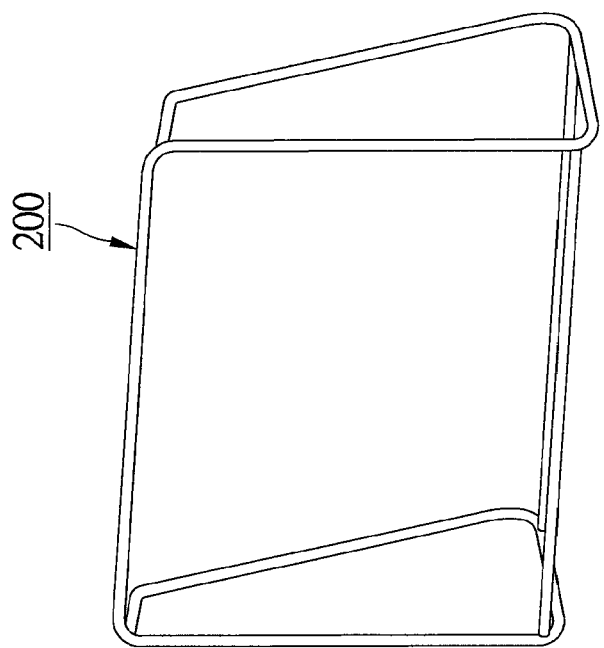
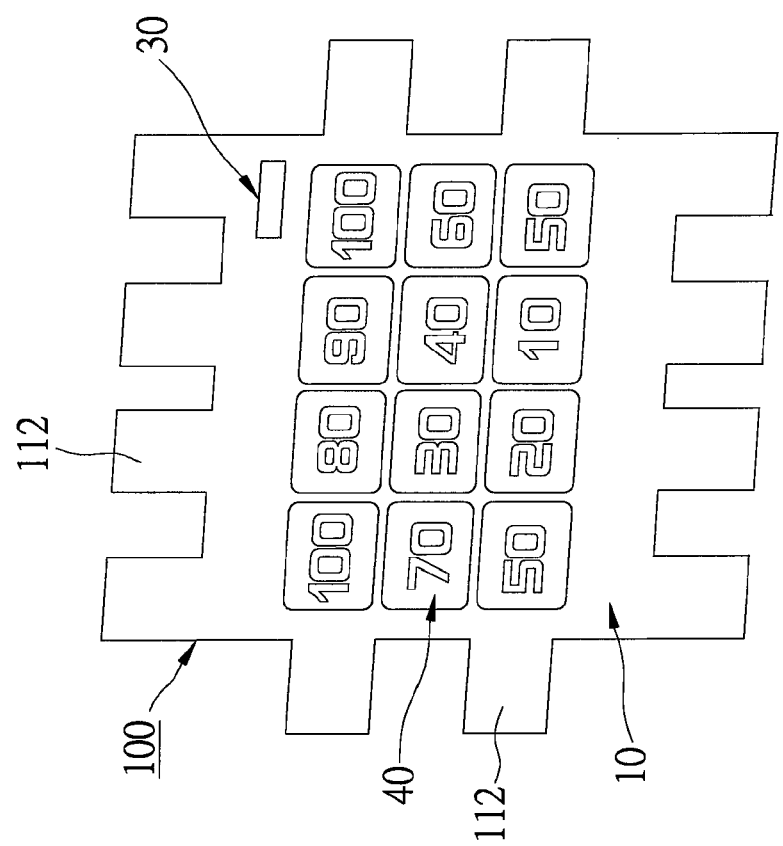
FIG.1

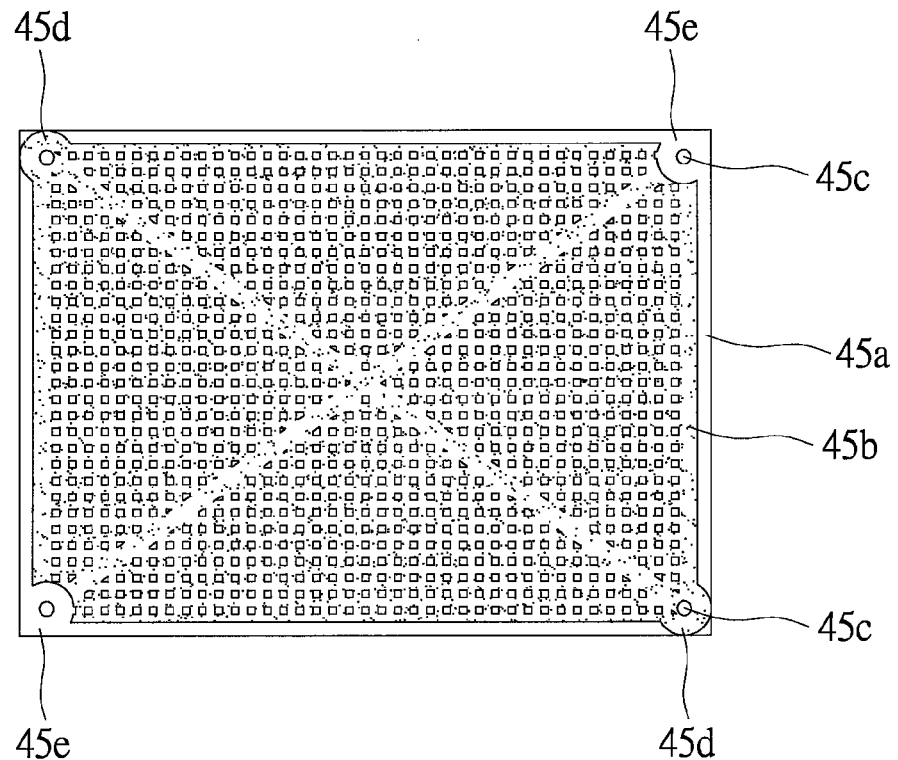
FIG.11
REPLACEMENT SHEET

ELECTRONIC SPORT SENSING DEVICE

BACKGROUND OF THE INVENTION

1. Field of the Invention

The present invention relates generally to an electronic game apparatus, and more particularly to an electronic sport sensing blanket.

2. Description of the Related Art

Electronic sport game is popular nowadays because players can both have fun and exercise during the game. For a baseball or soccer game, it includes an electronic sensing blanket which is flexible and has several score blocks thereon. The electronic sensing blanket has sensors behind the score blocks to sense which block is hit.

Usually, the electronic sensing blanket is fixed on a wall, and player throw or kick a ball to the blanket. When the ball hits the blanket, it will cause the hit portion warped that the sensor behind it will produce a signal and transmit it to a processor and show a result on a screen. The screen shows the score of the hit block for the game. The conventional electronic sensing blanket has several drawbacks, which are listed below:

1. Even when the electronic sensing blanket is fixed on a wall, it still has false sensing. The flexible blanket cannot be totally attached to the wall, i.e. there are some gaps between the blanket and the wall so that deformation of the blanket will be different when different places are hit. Besides, long distances between the sensors and the processor will also affect the sensing result.

2. The conventional electronic sensing blanket has consistent blocks thereon, which means only one specific type of game is available with this blanket.

3. The conventional electronic sensing blanket has to be fixed on a wall so that the blanket can sense the location hit. In other words, places to play the game are limited.

SUMMARY OF THE INVENTION

The primary objective of the present invention is to provide an electronic sport sensing device, which has a stable sensing and is portable for mounting to any desired place.

To achieve the objective of the present invention, an electronic sensing device includes a blanket, at least a sensor unit, and a display unit. The blanket has a circuit unit thereon and a plurality of couplers electrically connected to the circuit unit. The sensor unit is detachably fastened to the blanket and electrically connected to the couplers. The sensor unit has an impact surface. The display unit is electrically connected to the circuit unit of the blanket to show a message when the impact surface of the sensor unit receives an external force.

In an embodiment, the blanket has at least a connector region, on which the sensor unit is mounted. The couplers of the blanket each includes first couplers and second couplers, and the sensor unit includes an up conductive layer, a low conductive layer, at least a first coupler, and at least a second coupler. The up conductive layer is electrically connected to the first coupler of the sensor unit, which is electrically connected to the first coupler of the blanket, and the low conductive layer is electrically connected to the second coupler of the sensor unit, which is electrically connected to the second coupler of the blanket. The up conductive layer is insulated from the low conductive layer in a normal condition, and the up conductive layer is warped to contact the low conductive layer when the impact surface receives an external force.

In an embodiment, the first and second couplers of the sensor unit are detachably engaged with the first and second couplers of the blanket to provide a fast and easy way to mount and dismount the sensor unit on and from the connecting region of the blanket.

BRIEF DESCRIPTION OF THE DRAWINGS

FIG. 1 is a perspective view of the electronic sport sensing device and the frame in separation of a preferred embodiment of the present invention;

FIG. 11 is a front view of the low conductive layer of the sensor unit;

DETAILED DESCRIPTION OF THE INVENTION

Figure 2:
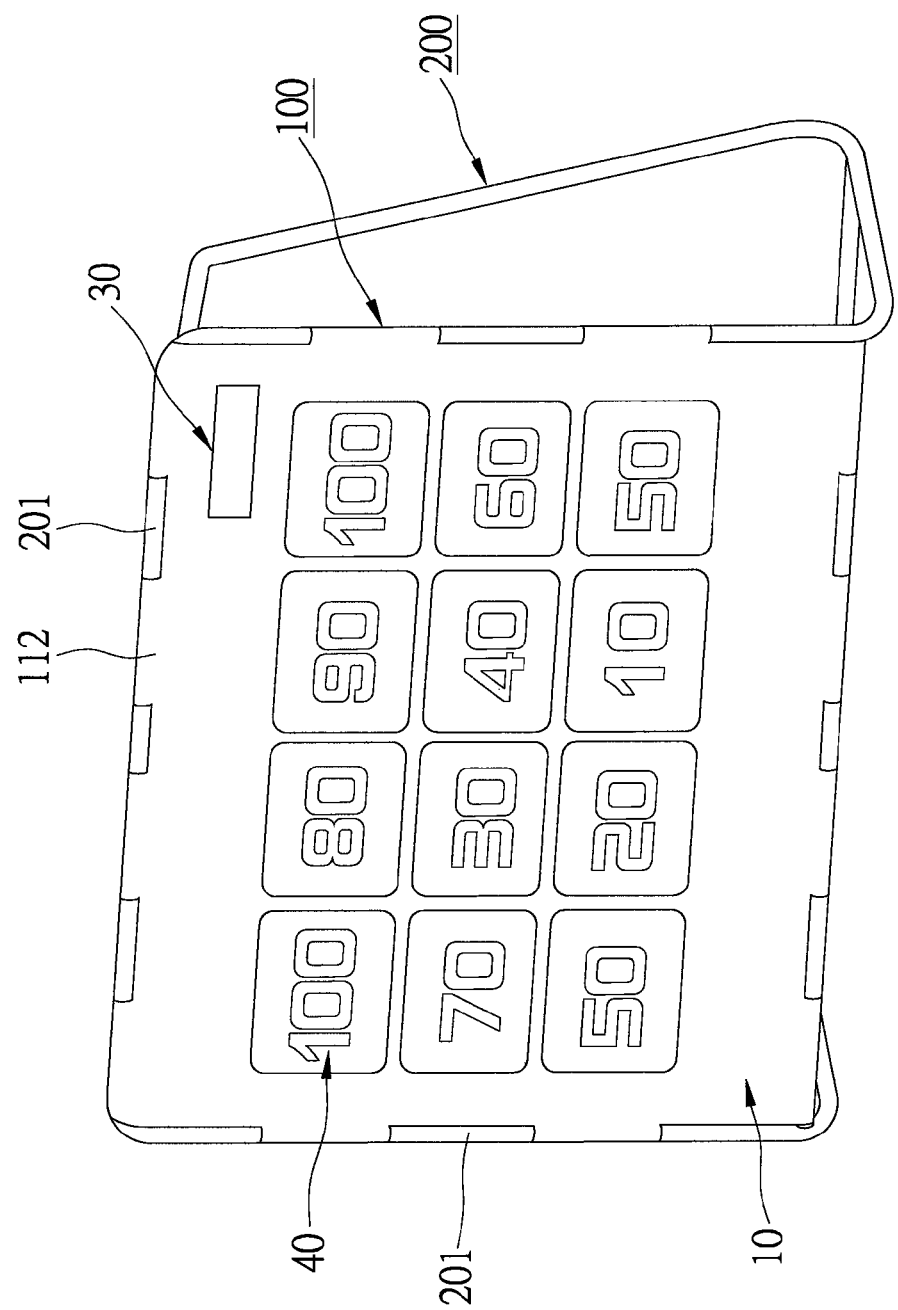
FIG. 2 is a perspective view of the electronic sport sensing device and the frame in combination of a preferred embodiment of the present invention.
Figure 3:
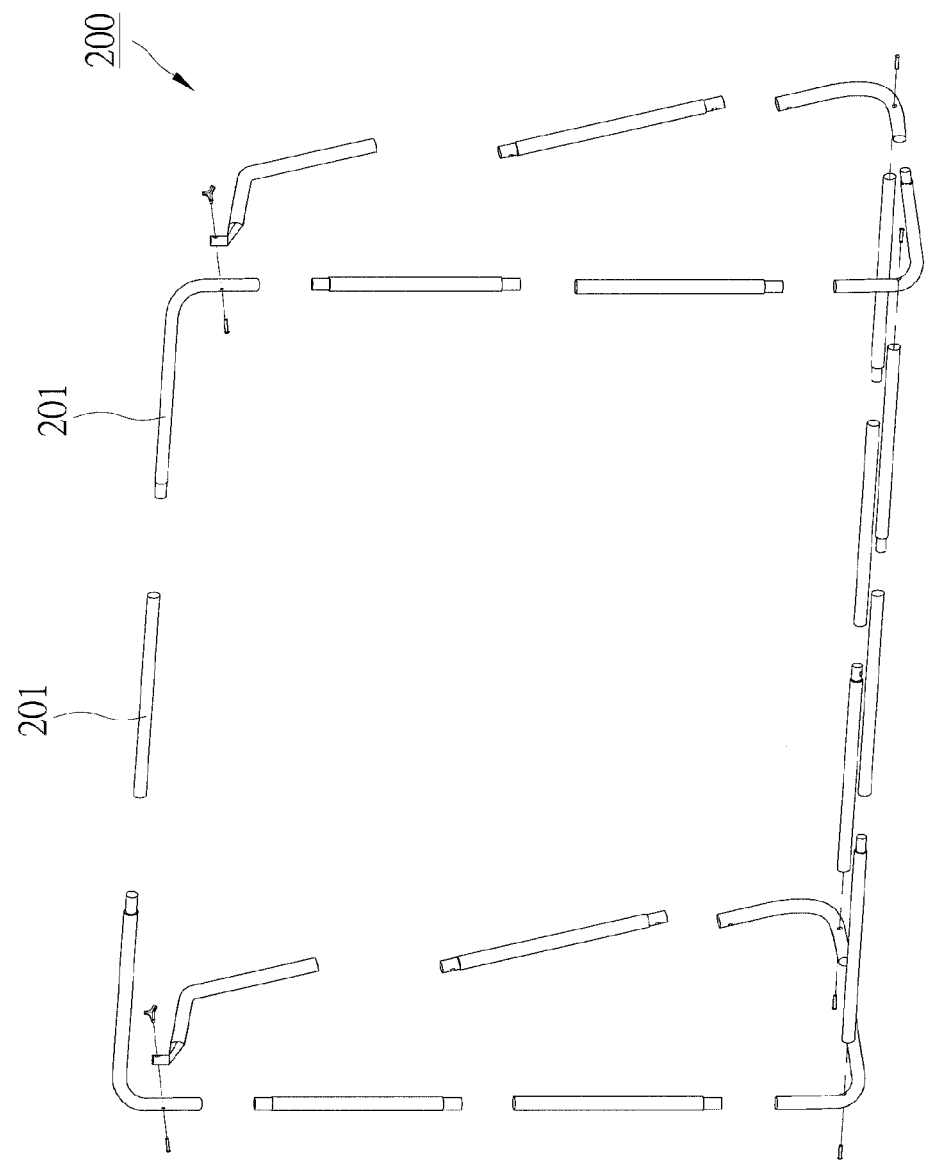
FIG. 3 is an exploded view of the fame of the preferred embodiment of the present invention.

As shown in FIG. 1 and FIG. 2, the present invention provides an electronic sport sensing device 100 and a frame 200. As shown in FIG. 3, the frame 200 is composed of several pipes 201. The combination of the electronic sport sensing device 100 and the frame 200 forms a sport apparatus.

FIG. 4 to FIG. 7 show elements of the electronic sport sensing device 100 including a blanket 10, a circuit unit 20, a display unit 30, and a plurality of sensor units 40.

Figure 4:
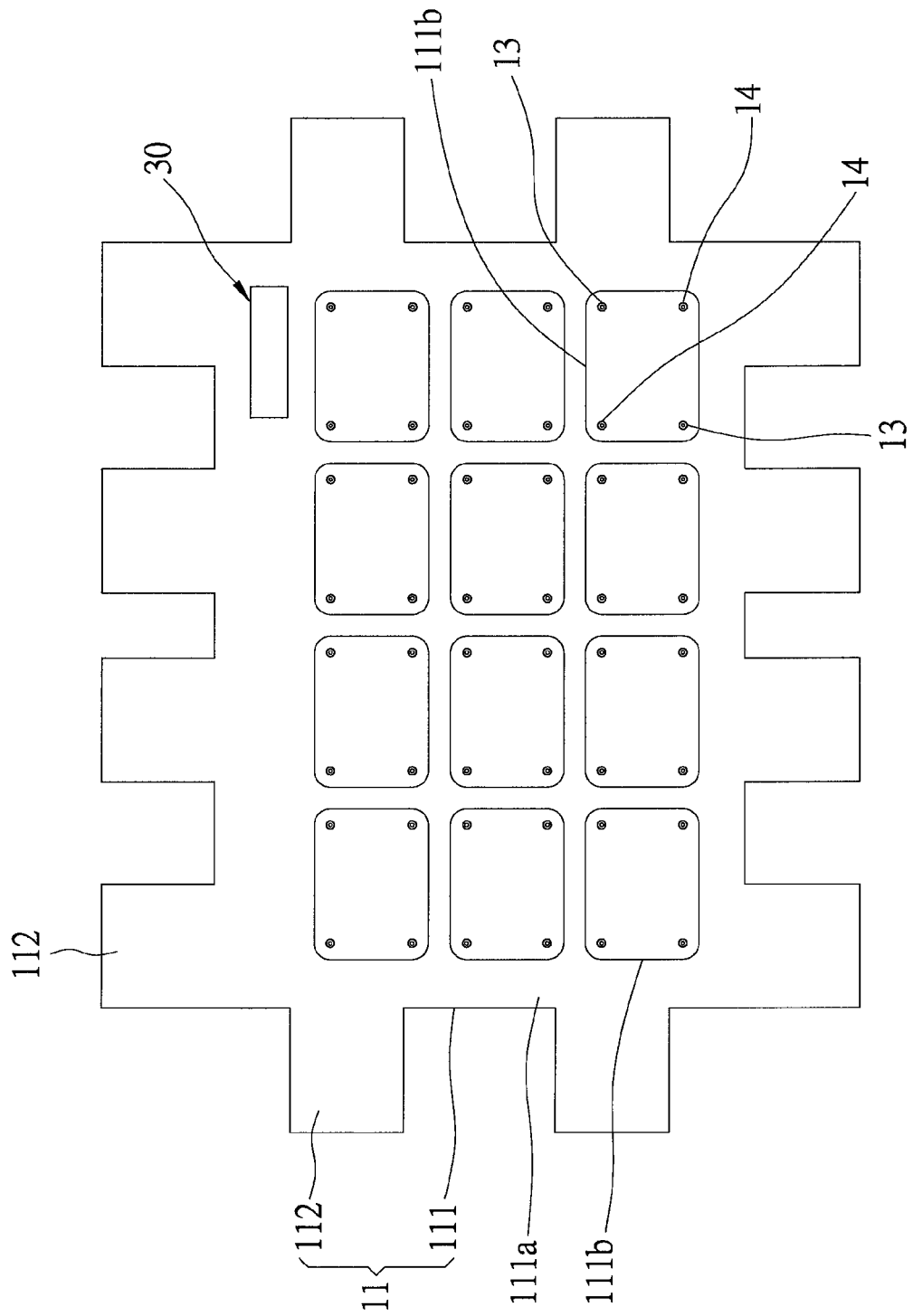
FIG. 4 is a front view of the front cover of the electronic sport sensing device of the preferred embodiment of the present invention.
Figure 5:
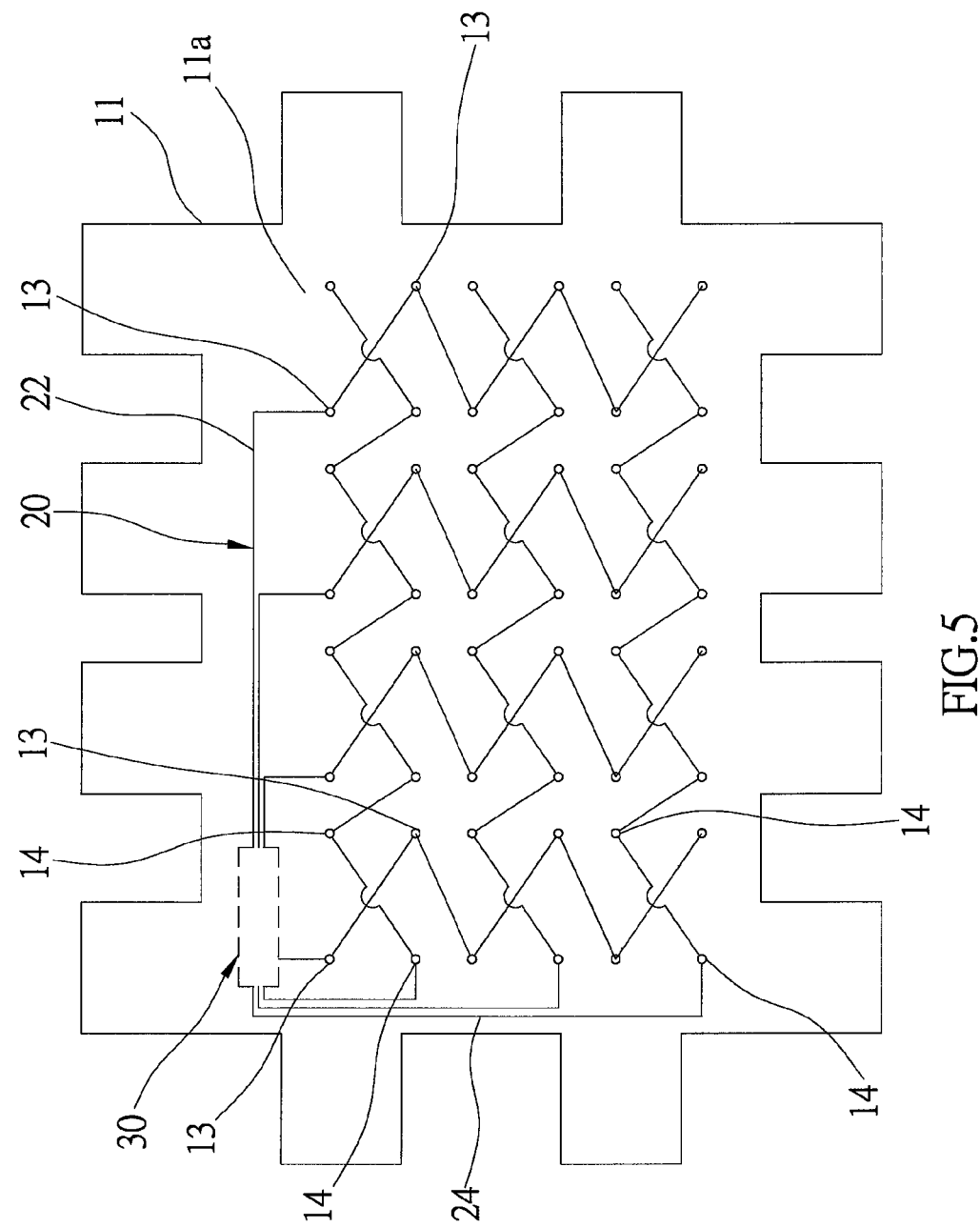
FIG. 5 is a rear view of the front cover of the electronic sport sensing device of the preferred embodiment of the present invention.
Figure 6:
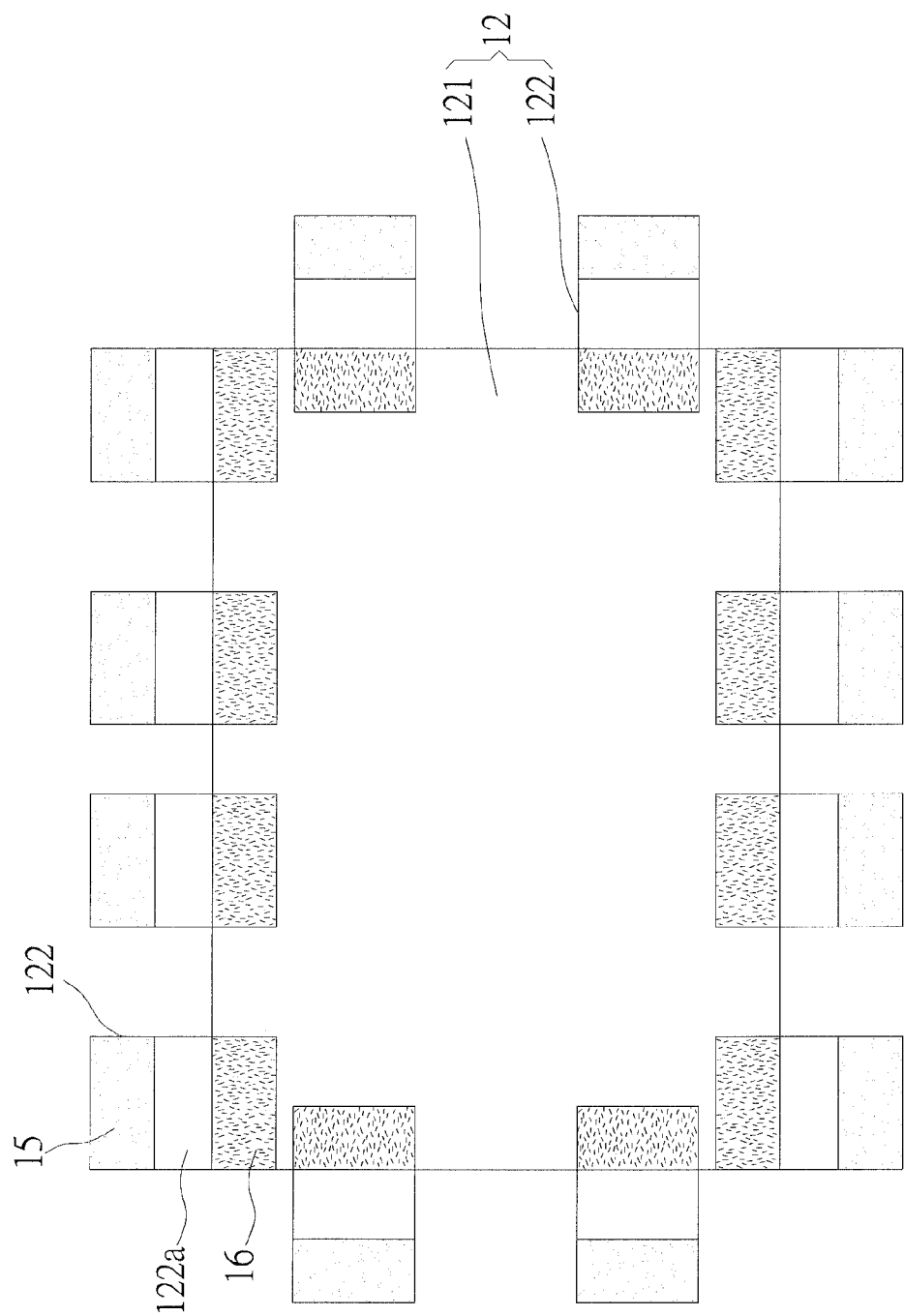
FIG. 6 is a front view of the rear cover of the electronic sport sensing device of the preferred embodiment of the present invention.

As shown in FIG. 4 to FIG. 6, the blanket 10 includes a front cover 11 and a rear cover 12. In the present invention, the front cover 11 is made of nylon, so it is flexible. The rear cover 12 is made of polyvinyl chloride (PVC), which is also flexible. FIG. 4 shows the front cover 11 having a rectangular sheet 111 with a greater area and a plurality of connecting sheets 112 around the rectangular sheet 111. The rectangular sheet 111 has a surface 111a, on which plural rectangular connecting regions 111b are provided. Each of the connecting regions 111b has four conductive connectors at four corners thereof wherein two diagonal connectors are defined as first couplers 13, and the other two diagonal connectors are defined as second couplers 14.

As shown in FIG. 5, the circuit unit 20 is provided on a back side 11a of the front cover 11. The circuit unit 20 has first wires 22, which have ends connected to the first couplers 13, and second wires 24, which have ends connected to the second couplers 14, and both of the first and second wires 22, 24 have the other ends connected to the display unit 30. In the present invention, the first and second wires 22, 24 are flexible cables. They also may be a printed circuit or other relative devices. The display unit 30, in the present invention, is a numeral displayer mounted on the blanket, however, it could also be any relative displayers mounted on a suitable place.

FIG. 6 shows the rear cover 12 of the blanket 10 which has a rectangular sheet 121 and a plurality of connecting sheets 122 around the rectangular sheet 121. Each of the connecting sheets 122 is provided with a hook Velcro device 15 on a surface 122a thereof and a loop Velcro device 16 neighboring to the hook Velcro device 15. The connecting sheets 112 of the front cover 11 are stitched to the corresponding connecting sheets 122 of the rear cover 12 to form a connecting device of the blanket 10. In the present invention, the stitched connecting sheets are put around the pipes 201 of the frame 200 with the hook Velcro devices 15 and the loop Velcro device 16 coupled together to bond the blanket 10 to the frame 200.

Figure 7:
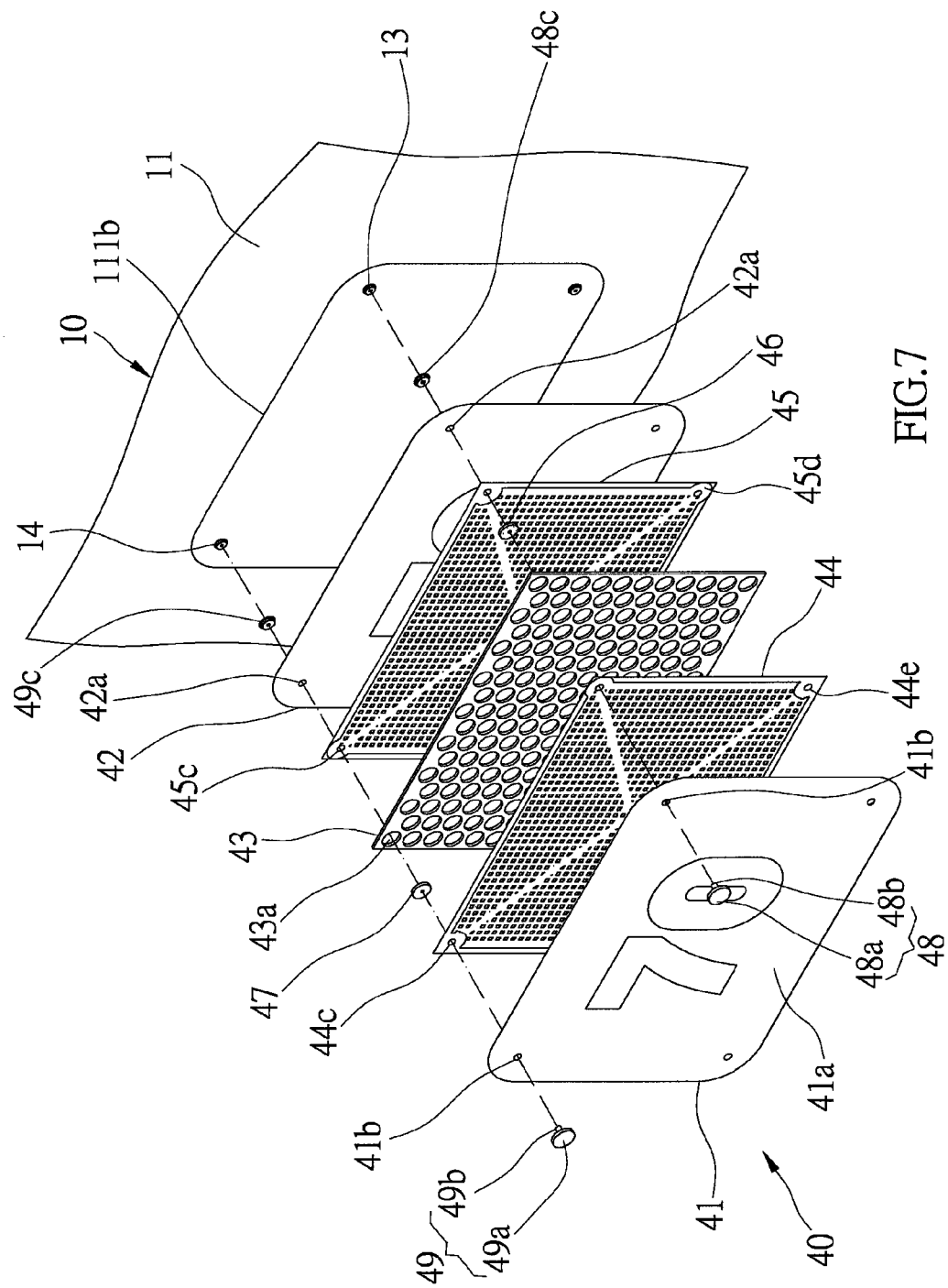
FIG. 7 is an exploded view of the sensor unit of the preferred embodiment of the present invention.
Figure 8:
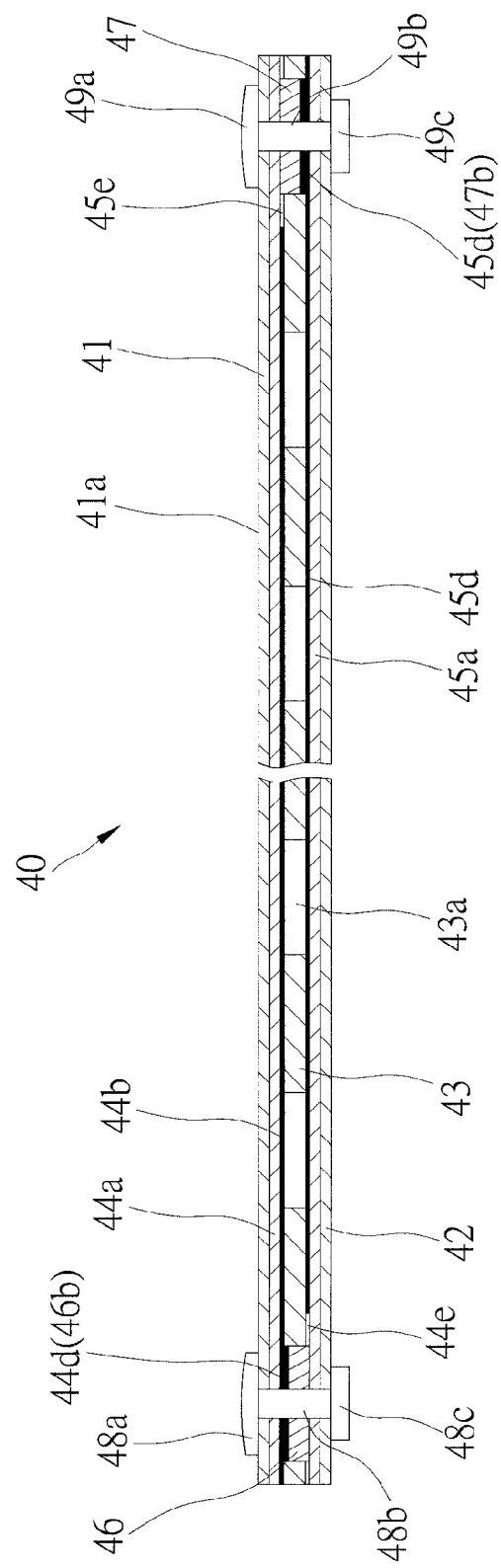
FIG. 8 is a sectional view of the sensor unit of the preferred embodiment of the present invention, showing insulation between the up conductive layer and the low conductive layer.

As shown in FIG. 7 and FIG. 8, the size and shape of the sensor units 40 are substantially the same as the connecting regions 111b. Each of the sensor units 40 includes a front sheet 41, a rear sheet 42, an insulating layer 43, an up conductive layer 44, a low conductive layer 45, two first conductive pads 46, two second conductive pads 47, two first couplers 48, and two second couplers 49.

The front sheet 41 is flexible with an impact region 41a, on which a specific pattern is printed, on a side thereof. In the present invention, the impact region 41a is printed with a score number. "70" shown in FIG. 7 is the score when a player hits this region and is shown on the display unit 30. The front sheet 41 has four bores 41b at four corners thereof.

The rear sheet 42 is flexible too with four bores 42a on four corners thereof.

Figure 9:
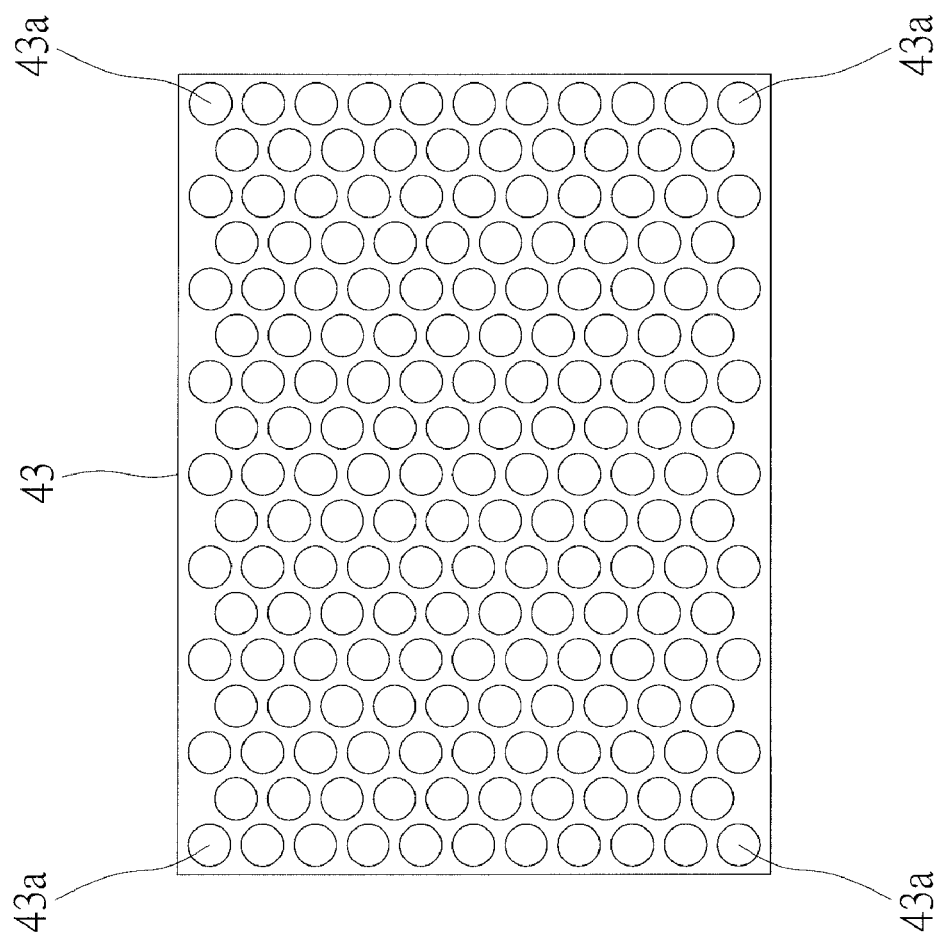
FIG. 9 is a front view of the insulating layer of the sensor unit.

The insulating layer 43 is made of foam and is between the front sheet 41 and the rear sheet 42. As shown in FIG. 9, the insulating layer 43 has a plurality of openings 43a. Four of the openings 43a at four corners of the insulating layer 43 are aligned with the corresponding bores 41b of the front sheet 41 and 42a of the rear sheet 42 respectively.

Figure 10:
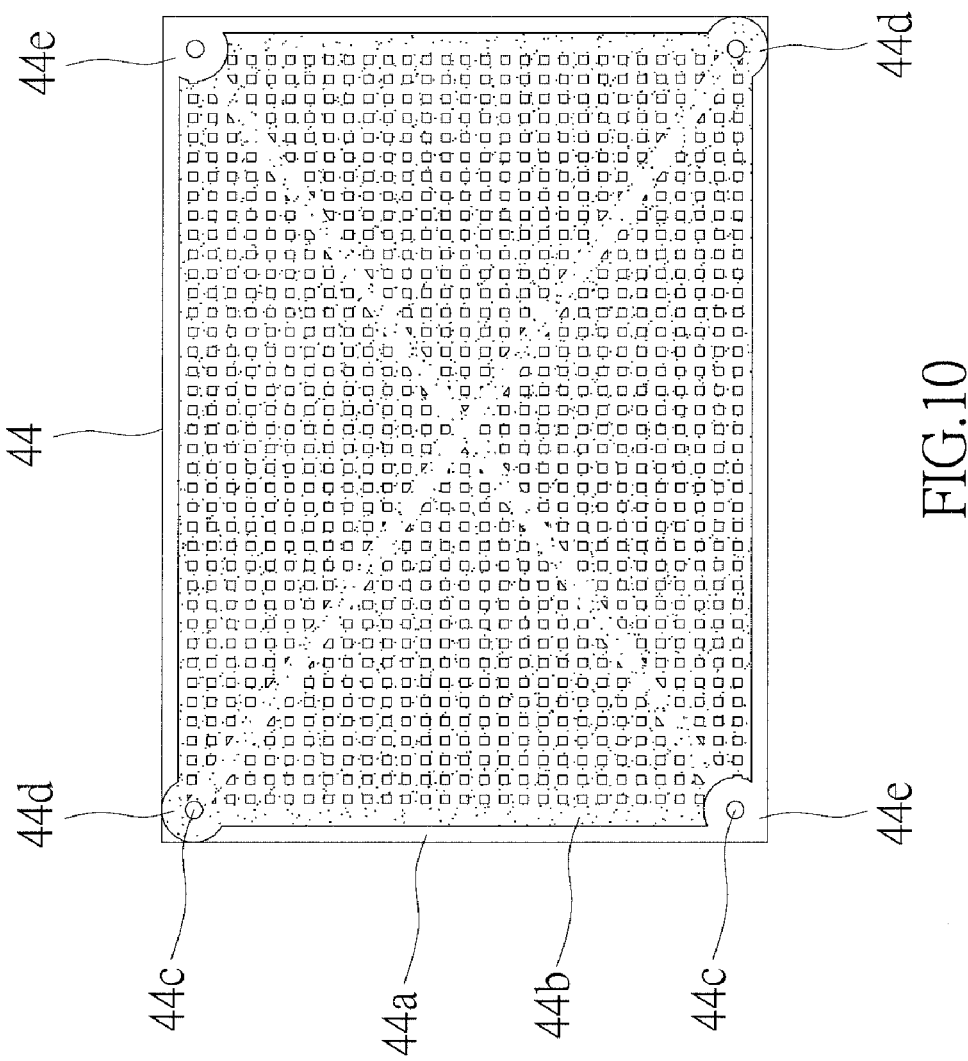
FIG. 10 is a front view of the up conductive layer of the sensor unit.

The up conductive layer 44 is between the front sheet 41 and the insulating layer 43. As shown in FIG. 10, the up conductive layer 44 includes a transparent base film 44a, on which a conductive pattern 44b is printed. The base film 44a has four bores 44c at four corners also. The conductive pattern 44b has two conductive portions 44d around two diagonal bores of 44c. The conductive pattern 44b does not reach the other two bores of 44c that it has insulating portions 44e at the bores 44c.

The low conductive layer 45 is between the rear sheet 42 and the insulating layer 43. As shown in FIG. 11, the low conductive layer 45, similar to the up conductive layer 44, has a base film 45a, on which a conductive pattern 45b and four bores 45c are provided. The conductive pattern 45b has two conductive portions 45d and two insulating portions 45e around the diagonal bores 45c respectively. The conductive patterns 44b, 45b of the up and low conductive layer 44, 45 are at opposite sides of the insulating layer 43. The bores 44c of the up conductive layer 44 with the conductive portions 44d are aligned with the bores 45c of the low conductive layer 45 with the insulating portions 45e, and the bores 44c of the up conductive layer 44 with the insulating portions 44e are aligned with the bores 45c of the low conductive layer 45 with the conductive portions 45d.

Figure 12:
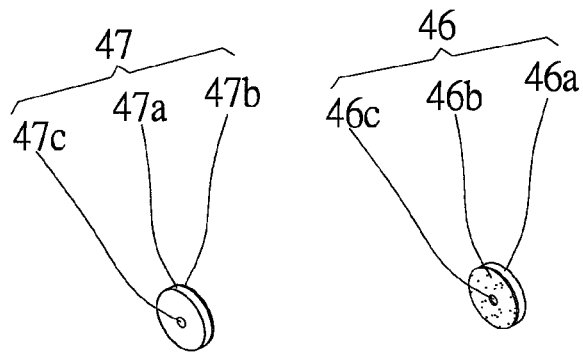
FIG. 12 is a perspective view of the first and second conductive pads of the sensor unit.
Figure 13:
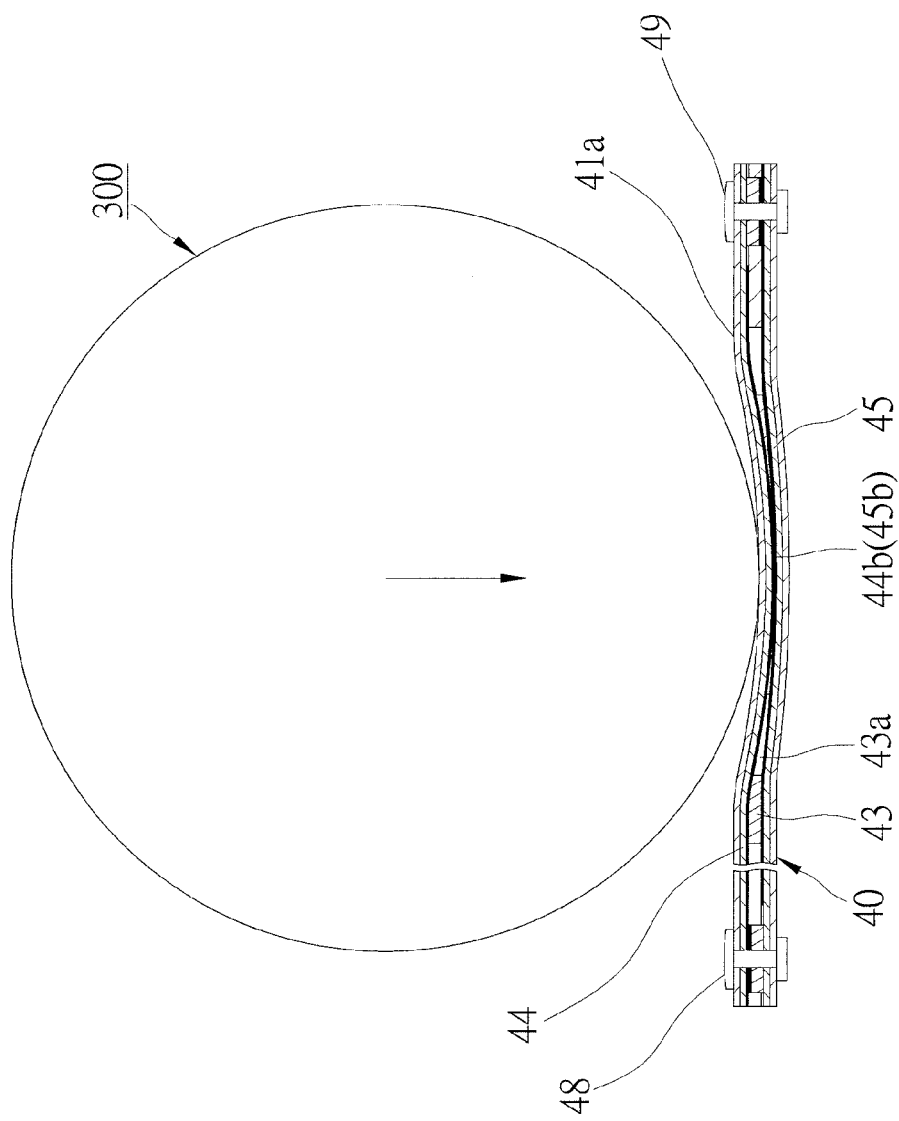
FIG. 13 is similar to FIG. 8, showing the sensor unit being hit by a ball to have a contact between the up and low conductive layers.

As shown in FIG. 12, each of the first conductive pads 46 has an insulating portion 46a, a conductive portion 46b on a top of the insulating portion 46a, and a bore 46c through the insulating portion 46a and the conductive portion 46b. Each of the first conductive pad 46 is received in the specific opening 43a of the insulating layer 43 to have the conductive portion 46b contacting the corresponding conductive portions 44d of the up conductive layer 44.

The second conductive pads 47 are the same as the first conductive pads 46 having an insulating portion 47a, a conductive portion 47b, and a bore 47c. The second conductive pads 47 are received in the specific openings 43a of the insulating layer 43 to have the conductive portion 47b contacting the corresponding conductive portions 45d of the low conductive layer 45.

The first couplers 48 are electrically connected to the conductive pattern 44b of the up conductive layer 44 and the first couplers 13 of the blanket 10 respectively. Each of the first couplers 48 has a plastic head 48a, a metallic body 48b connected to the head 48a, and a metallic buckle 48c. As shown in FIG. 7 and FIG. 8, the body 48b of the first couplers 48 is inserted into the bore 41b of the front sheet 41, the bore 44c with the conductive portion 44d of the up conductive layer 44, the bore 46c of the first conductive pad 46, the bore 45c with the insulating portion 45e of the low conductive layer 45, and the bore 42a of the rear sheet 42 in sequence, and then is coupled to the buckle 48c that the front sheet 41, the up conductive layer 44, the first conductive pad 46, the low conductive layer 45, and the rear sheet 42 are clipped by the head 48a and the buckle 48c. The first couplers 48 are electrically connected to the conductive portions 46b of the first conductive pads 46 but the conductive pattern 45b of the low conductive layer 45 that the first couplers 48 electrically connect the conductive pattern 44b of the up conductive layer 44 to the first couplers 13 of the blanket 10 respectively.

The second couplers 49, the same as the first couplers 48, each has a plastic head 49a, a metallic body 49b and a metallic buckle 49c. The body 49b is inserted into the bore 41b of the front sheet 41, the bore 44c with the insulating portion 44e of the up conductive layer 44, the bore 46c of the second conductive pad 47, the bore 45c with the conductive portion 45d of the low conductive layer 45, and the bore 42a of the rear sheet 42 in sequence, and then is coupled to the buckle 48c that the front sheet 41, the up conductive layer 44, the first conductive pad 46, the low conductive layer 45, and the rear sheet 42 are clipped by the head 49a and the buckle 49c. The second couplers 49 electrically connect the conductive pattern 45b of the low conductive layer 45 to the second couplers 14 of the blanket 10 respectively via the second conductive pads 47.

The sensor units 40 of the present invention have the first and second couplers 48, 49, and are engaged with the first and second couplers 13, 14 respectively to electrically connect the sensor units 40 to the connecting regions 111b of the blank 10 respectively. The sensor units 40 also are electrically connected to the display unit 30 via the circuit unit 20. In a normal condition, the up conductive layer 44 and the low conductive layer 45 are separated by the insulating layer 43, as shown in FIG. 8.

In operation, the sensor units 40 are mounted on the connecting regions 111b of the blank 10, and then the blanket 10 is fastened to the frame 200. The frame 200 is put in a suitable place to play a game. Player may throw (or kick) a ball 300 to the blanket 10. When the ball 300 is hitting the blanket 10 on the impact surface 41a of one of the sensor units 40, it will warp the very sensor unit 40 and cause the conductive pattern 44b of the up conductive layer 44 contacting the conductive pattern 45b of the low conductive layer 45 through the openings 43a of the insulating layer 43, which will produce a signal and show a specific score on the display unit 30.

The functions and advantages of the present invention are listed below:

1. The sensors units 40 are mounted on the blanket 10 through engagement of the couplers 13, 14, 48, and 49, which is a fast way of engaging and disengaging the sensors units 40 with the blanket 10.

2. The sensor units 40 may be randomly mounted on the specific connecting regions 111b of the blanket 10, which will create a new game or change the level of difficulty.

3. The sensor units 40 are modularized that may be massively produced in a lower cost.

4. The sensors units 40 are mounted on the connecting regions 111b of the blanket 10 and electrically connected to the circuit unit 20. The independent sensors units 40 are sensitive to external force without false detection, and show the detected result on the display unit 30.

5. The sport sensing device 100 is fastened to the frame 200 by the Velcro devices 15 and 16, which is a fast and easy way to mount and dismount the sport sensing device 100.

The description above is a few preferred embodiments of the present invention and the equivalence of the present invention is still in the scope of claim construction of the present invention.

What is claimed is:

1. An electronic sensing device, comprising:
    a blanket, on which a circuit unit is provided, having a plurality of blanket couplers;
    wherein the blanket has at least a plurality of connecting regions, where a plurality of sensor units are mounted thereto, and the plurality of blanket couplers include first blanket couplers and second blanket couplers for each of the plurality of connecting regions;
    wherein the circuit unit includes first wires and second wires, the first wires having ends that are attached to the first blanket couplers and the second wires having ends that are attached to the second couplers of each of the plurality of connecting regions, and the first and second wires being connected to a display unit;
    wherein a plurality of sensor units, which each have an impact surface, are detachably fastened to the blanket and electrically connected to the plurality of blanket couplers;
    wherein each of the plurality of the sensor units include an up conductive layer, a low conductive layer, at least a first sensor unit coupler, and at least a second sensor unit coupler, further wherein the up conductive layer is electrically connected to the first sensor unit coupler, which is electrically connected to the first blanket coupler, and the low conductive layer is electrically connected to the second sensor unit coupler, which is electrically connected to the second blanket coupler, and the up conductive layer is insulated from the low conductive layer in a normal condition, and the up conductive layer is warped to contact the low conductive layer when the impact surface receives an external force;
    wherein each of the plurality of sensor units further include an insulating layer between the up conductive layer and the low conductive layer which has at least an opening for the warped up conductive layer contacting the low conductive layer through the opening;
    wherein each of the plurality of sensor units further include a front sheet with the impact surface thereon and a rear sheet to sandwich the up conductive layer, the insulating layer, and the low conductive layer therebetween, and the up conductive layer is behind the front sheet;
    wherein a respective one of each of the first blanket couplers and the second blanket couplers are detachably engaged with the first sensor coupler and the second sensor coupler of each of the plurality of sensor units to fix each of the plurality of sensor units on one of the plurality of connecting regions of the blanket; and
    wherein the display unit is electrically connected to the circuit unit of the blanket to show a message when the impact surface of each of the plurality of sensor units receive an external force.

2. The electronic sensing device as defined in claim 1, wherein the first sensor unit coupler and the second sensor unit coupler each have a head, a metallic body connected to the head, and a metallic buckle detachably engaged with the metallic body wherein metallic the body passes through the front sheet, the up conductive layer, the insulating layer, the low conductive layer, and the rear sheet in sequence, and then the metallic buckle is engaged with the metallic body, and wherein the first sensor unit coupler and the second sensor unit coupler of each of the plurality of sensor units are detachably engaged by the metallic buckles to the respective one of each of the first blanket couplers and the second blanket couplers.

3. The electronic sensing device as defined in claim 2, wherein each of the plurality of the sensor units further include at least a first conductive pad and a second conductive pad between the up conductive layer and the low conductive layer each of which has an insulating portion and a conductive portion, wherein the sensor unit further includes at least a first conductive pad and a second conductive pad between the up conductive layer and the low conductive layer, wherein the conductive pattern of the up conductive layer is electrically connected to the conductive portion of the first conductive pad and the conductive portion of the first conductive pad is electrically connected to the metallic body of the first sensor unit coupler, and the conductive pattern of the low conductive layer is electrically connected to the conductive portion of the second conductive pad and the conductive portion of the second conductive pad is electrically connected to the metallic body of the second sensor unit coupler.

4. The electronic sensing device as defined in claim 1, wherein the plurality of blanket couplers are conductive, the first sensor unit coupler and the second sensor unit coupler of each of the plurality of sensor units are conductive.

5. The electronic sensing device as defined in claim 1, wherein the insulating layer is made of foam.

* * * * *